(12) United States Patent
Kameyama et al.

(10) Patent No.: US 10,433,620 B2
(45) Date of Patent: Oct. 8, 2019

(54) METHOD FOR MANUFACTURING SLIDE FASTENER CHAIN

(71) Applicant: YKK Corporation, Tokyo (JP)

(72) Inventors: Hirokazu Kameyama, Toyama (JP); Isamu Michihata, Toyama (JP); Yui Hashimoto, Toyama (JP)

(73) Assignee: YKK Corporation (JP)

( * ) Notice: Subject to any disclaimer, the term of this patent is extended or adjusted under 35 U.S.C. 154(b) by 192 days.

(21) Appl. No.: 15/535,934

(22) PCT Filed: Dec. 25, 2014

(86) PCT No.: PCT/JP2014/084423
§ 371 (c)(1),
(2) Date: Jun. 14, 2017

(87) PCT Pub. No.: WO2016/103426
PCT Pub. Date: Jun. 30, 2016

(65) Prior Publication Data
US 2017/0332744 A1  Nov. 23, 2017

(51) Int. Cl.
*A44B 19/32* (2006.01)
*A44B 19/08* (2006.01)
(Continued)

(52) U.S. Cl.
CPC .............. *A44B 19/32* (2013.01); *A44B 19/08* (2013.01); *A44B 19/12* (2013.01); *B29C 43/28* (2013.01);
(Continued)

(58) Field of Classification Search
CPC ......... A44B 19/32; A44B 19/08; A44B 19/12; B29D 5/02; B29C 43/28; B29K 2995/0069; B29K 2067/00; B29L 2005/00
See application file for complete search history.

(56) References Cited

U.S. PATENT DOCUMENTS 2,557,827 A * 6/1951 Krupp .................... A44B 19/32
24/389
2,923,992 A * 2/1960 Armstrong ............. A44B 19/32
24/387
(Continued)

FOREIGN PATENT DOCUMENTS

JP       H01-14168 A1    1/1986
JP       2000-312604 A   11/2000
(Continued)

OTHER PUBLICATIONS

International Search Report, PCT Patent Application No. PCT/JP2014/084423, dated Mar. 17, 2015.
(Continued)

*Primary Examiner* — Jeffrey M Wollschlager
(74) *Attorney, Agent, or Firm* — Kilpatrick Townsend & Stockton LLP

(57) ABSTRACT

A waterproof fastener chain includes: a pair of fastener tapes made of polyester resin adjacent to each other at a given space between each side edge thereof, rows of elements respectively attached onto a main surface of the side edge of each of the fastener tapes, and waterproof coated films made of polyester resin respectively formed on a main surface of each of the fastener tapes. An outer surface of each of the waterproof coated films is flat at least at a position where a slider is to pass over, each of the waterproof coated films penetrates into irregularities on the main surface of each of the fastener tapes, a penetration depth of the waterproof coated films into a gap caused by the space of the pair of fastener tapes is not more than thickness of the fastener tapes.

5 Claims, 10 Drawing Sheets

(51) Int. Cl.
*B29C 43/28* (2006.01)
*B29D 5/02* (2006.01)
*A44B 19/12* (2006.01)
*B29K 67/00* (2006.01)
*B29L 5/00* (2006.01)

(52) U.S. Cl.
CPC ............ *B29D 5/02* (2013.01); *B29K 2067/00* (2013.01); *B29K 2995/0069* (2013.01); *B29L 2005/00* (2013.01)

(56) References Cited

U.S. PATENT DOCUMENTS

| | | | | |
|---|---|---|---|---|
| 3,490,109 | A * | 1/1970 | Heimberger | A44B 19/32 24/389 |
| 3,501,816 | A * | 3/1970 | Heimberger | A44B 19/32 24/389 |
| 3,591,914 | A * | 7/1971 | Heimberger | A44B 19/26 29/408 |
| 3,764,437 | A * | 10/1973 | Heimberger | A44B 19/32 156/152 |
| 4,350,721 | A * | 9/1982 | Nagase | A44B 19/34 160/DIG. 18 |
| 4,724,586 | A * | 2/1988 | Tsubokawa | A44B 19/32 24/384 |
| 5,437,888 | A * | 8/1995 | Ortlieb | A44B 19/32 24/389 |
| 6,105,214 | A | 8/2000 | Press | |
| 6,427,294 | B1 * | 8/2002 | Shibaike | A44B 19/32 24/381 |
| 6,497,014 | B2 * | 12/2002 | Neugebauer | A44B 19/32 24/387 |
| 8,397,353 | B2 * | 3/2013 | Chou | A44B 19/32 24/391 |
| 9,700,106 | B2 * | 7/2017 | Kojima | A44B 19/26 |
| 2006/0016051 | A1 | 1/2006 | Wang et al. | |
| 2006/0101632 | A1 | 5/2006 | Yang | |
| 2010/0125982 | A1 * | 5/2010 | Chou | A44B 19/32 24/397 |
| 2010/0154179 | A1 | 6/2010 | Blackford et al. | |
| 2011/0005042 | A1 | 1/2011 | Thomas et al. | |
| 2012/0023713 | A1 * | 2/2012 | Williams | A44B 19/32 24/398 |
| 2013/0333166 | A1 * | 12/2013 | Shimono | A44B 19/24 24/435 |
| 2014/0130974 | A1 * | 5/2014 | Chen | A44B 19/32 156/270 |

FOREIGN PATENT DOCUMENTS

| | | |
|---|---|---|
| JP | 2002-525143 A1 | 8/2002 |
| JP | 3580725 B1 | 10/2004 |
| JP | 2006-136705 A | 6/2006 |
| JP | 4312171 B1 | 8/2009 |
| JP | 2012-24573 A1 | 2/2012 |
| JP | 2013-173003 A | 9/2013 |
| JP | 5387912 B1 | 1/2014 |
| TW | I220106 A1 | 8/2004 |

OTHER PUBLICATIONS

International Preliminary Report on Patentability, PCT Patent Application No. PCT/JP2014/084423, dated Jul. 6, 2017.

* cited by examiner

METHOD FOR MANUFACTURING SLIDE FASTENER CHAIN

This application is a national stage application of PCT/JP2014/084423, which is incorporated herein by reference.

TECHNICAL FIELD

The present invention relates to a waterproof slide fastener. More particularly, the present invention relates to a coil type slide fastener having a waterproof function.

BACKGROUND ART

Slide fasteners are widely used as opening and closing tools for dairy necessaries such as clothing items, bags, shoes and sundries, as well as for protective clothing items such as space suits, chemical protective clothing, diving suits, lifeboats and survival suits, and covers for shipping containers, tents and the like. For such special applications, waterproof properties are also required for the slide fasteners.

In general, the slide fastener is mainly composed of three parts: a pair of elongated fastener tapes; fastener elements which are engaging parts for the fastener and are attached along one side edge of each tape; and a slider for controlling opening and closing of the fastener by engaging and disengaging the fastener elements. Conventionally, a slide fastener is known in the art, which exhibits the waterproof property by affixing a synthetic resin film having the waterproof property to the fastener tape in order to provide the waterproof property and closely contacting the synthetic resin films of right and left fastener tapes during engagement.

For example, Japanese Patent Application Public Disclosure (KOHYO) No. 2002-525143 A1 (Patent Document 1) discloses that a water resistant film such as a polyurethane film is attached to one side of a fastener tape in a slide fastener by a transfer lamination method using nip rollers or laminating rollers. It also discloses that the film is preferably a multilayer structure including an outer wear resistant layer and an inner layer having a low melt material. It discloses that the provision of the wear resistant layer enhances the wear resistance and reduces the coefficient of friction to allow for ease of operation, and embedding of a portion of the low melt layer into the material of fastener tapes enhances adhesion of the film to the fastener tape. It also discloses that the polyurethane film is coated with an inner layer composed of a polyurethane adhesive, a binding agent or a hot melt adhesive.

Taiwan Patent Application Publication No. I220106 A1 (Patent Document 2) describes a method for forming a waterproof layer by pressing a PU sheet with a release paper onto a fastener tape coated with a PU gel by a roller apparatus to bond the PU gel and the PU sheet, followed by thermoplastic bonding of the PU sheet to the PU gel by heating.

Japanese Patent No. 43121 71 B1 (Patent Document 3) describes a method for forming a waterproof thin film by permeating a liquid polyester synthetic resin-based waterproof material into a fastener fabric tape structure.

Japanese Examined Utility Model Application Publication No. H01-14168 A1 (Patent Document 4) discloses that a fastener tape is coated with a synthetic rubber such as a silicone rubber, a butyl rubber, neoprene, a polyurethane rubber or the like as a waterproof sealing layer, dried and deposited.

Japanese Patent No. 3580725 B1 (Patent Document 5) discloses that a laminated synthetic resin film composed of a low melting point resin layer and a high melting point resin layer is deposited on at least one side of a fastener tape in a slide fastener by applying heat and pressure such that the low melting point resin layer is faced with and in contact with the fastener tape surface. As materials of the laminated synthetic resin film, urethane-based resins and polyester-based resins are disclosed.

Japanese Patent No. 5387912 B1 (Patent Document 6) describes a method for extruding a coating layer made of polyurethane, polypropylene, polyvinyl chloride and rubber thermoplastic material onto a surface of a fastener tape. More particularly, the method comprises feeding the fastener tape to an extrusion die and extruding a coating layer of a waterproof polymer onto the surface of the fastener tape to form a waterproof layer.

Japanese Patent Application Public Disclosure (KOKAI) No. 2012-24573 A1 (Patent Document 7) discloses that a surface of a fastener tape is coated with a fin-shaped polymer material whose element side is expanded. It also discloses that the coating of the polymeric material is extruded into a tape. The polymer material includes thermoplastic elastomers such as polychloroprene, polyurethane elastomers and polyester elastomers. According to the document, a pair of fin-shaped polymeric materials can be sealed with each other during closing of the slide fastener, so that a liquid sealed state can be formed at the contacted surface of the polymeric materials.

PRIOR ART DOCUMENT

Patent Documents

Patent Document 1: Japanese Patent Application Public Disclosure (KOHYO) No. 2002-525143 A1
Patent Document 2: Taiwan Patent Application Publication No. I220106 A1
Patent Document 3: Japanese Patent No. 4312171 B1
Patent Document 4: Japanese Examined Utility Model Application Publication No. H01-14168 A1
Patent Document 5: Japanese Patent No. 3580725 B1
Patent Document 6: Japanese Patent No. 5387912 B1
Patent Document 7: Japanese Patent Application Public Disclosure (KOKAI) No. 2012-24573 A1

SUMMARY OF INVENTION

Problem to be Solved by the Invention

With increased interest in environmental protection in recent years, production of products with less environmental burden have been desired, but the conventional waterproof slide fasteners have not been intended to use the same types of resins for both the waterproof films and the fastener tapes. Therefore, conventionally, a synthetic rubber such as polyurethane has been mainly used as a material of the waterproof film, and the fastener tapes have been generally made of polyester. However, there is a problem that recycling becomes difficult if different types of resins are used for both of the waterproof film and the fastener tapes.

Further, conventionally, in order to ensure adhesive strength, the film has been often applied to the fastener tape after applying an adhesive to the film. Therefore, there has been a problem that the number of steps increases to lead to higher manufacturing costs. Further, there has been a problem that specialized education and special exhaust system are required for the production because adhesives may also contain components harmful to human bodies.

Japanese Patent No. 43121 71 A1 (Patent Document 3) describes the method for forming the waterproof thin film by allowing the liquid polyester synthetic resin-based waterproof material to permeate into the fastener fabric tape structure, but in this method, due to the use of the liquid polyester synthetic resin, the resin easily penetrates into a gap between the pair of fastener tapes. In other words, the waterproof material reaches the elements through the gap, which may cause problems that the resin adhering to the elements may be broken due to sliding of the slider and fragments of the resin are liable to fall off, and further flexibility of the fastener tape is deteriorated and texture is impaired. In addition, there is a problem that when the waterproof thin film is cut along the gap between the pair of fastener tapes and separated into two parts, if the waterproof thin film is formed even in the gap, thickness of the waterproof thin film to be cut will be increased, so that it is difficult to clearly cut the film at the center (dimensional accuracy is decreased) due to unevenness of the cut points.

Japanese Patent Application Public Disclosure (KOKAI) No. 2012-24573 A1 (Patent Document 7) lists a polyester elastomer as a polymer material, but this is for coating the surface of the fastener tape with the fin-shaped polymer material whose element side is expanded, by extrusion molding. In this way, sliding resistance is increased because the fin-shaped polymer materials are hermetically sealed. Further, convex portions due to the fin shape impair aesthetic appearance.

The present invention has been created in light of the above circumstances. An object of the present invention is thus to provide a waterproof slide fastener chain which can be produced at a lower cost and can have both recyclability and functionality. Further, another object of the present invention is to provide a slide fastener having such a waterproof slide fastener chain. Another object of the present invention is to provide a method for manufacturing such a waterproof fastener chain.

Means for Solving the Problem

As a result of extensive investigations to solve the above-mentioned problems, the present inventors have found that a method for forming a waterproof coated film is effective for solving the above problems, which comprises applying a polyester resin having a predetermined melt viscosity onto a fastener chain by curtain coating and then pressurizing it by a pair of rolls made of a low hardness material on the fastener tape side and a heated metal on the polyester resin side.

In one aspect, the present invention provides a waterproof fastener chain comprising:
 a pair of fastener tapes made of polyester resin adjacent to each other at a given space (s) between each side edge thereof,
 rows of elements respectively attached onto a main surface of the side edge of each of the fastener tapes, and
 waterproof coated films made of polyester resin respectively formed on a main surface of each of the fastener tapes that is opposite to the main surface having each of the attached rows of the elements,
wherein
 an outer surface of each of the waterproof coated films is flat at least at a position where a slider is to pass over,
 each of the waterproof coated films penetrates into irregularities on the main surface of each of the fastener tapes at an interface with each of the fastener tapes,
 a penetration depth (d) of the waterproof coated films into a gap caused by the space (s) of the pair of fastener tapes is not more than thickness of the fastener tapes, and
 each of the waterproof coated films has an edge extending from the side edge of each of the fastener tapes in a direction approaching each other to contact each other.

In an embodiment of the waterproof fastener chain according to the present invention, the penetration depth (d) of the waterproof coated films into the gap caused by the space (s) of the pair of fastener tapes is 400 μm or less.

In another embodiment of the waterproof fastener chain according to the present invention, the thickness of the waterproof coated films is from 50 to 350 μm.

In yet another embodiment of the waterproof fastener chain according to the present invention, each of the waterproof coated films penetrates at a depth of 80 μm or more into the irregularities on the surface of each of the fastener tapes at the interface with each of the fastener tapes.

In yet another embodiment of the waterproof fastener chain according to the present invention, a number density of portions where the waterproof coated films are lifted up from the fastener tapes is one or less per 100 $cm^2$.

In yet another embodiment of the waterproof fastener chain according to the present invention, the space (s) of the pair of fastener tapes is from 30 to 600 μm.

In yet another embodiment of the waterproof fastener chain according to the present invention, a melt viscosity at 200° C. of the polyester resin forming the waterproof coated films is from 50 to 3000 dPa·s.

In another aspect of the present invention, a method for manufacturing a waterproof fastener chain, comprising:
 preparing a fastener chain comprising a pair of fastener tapes made of polyester resin adjacent to each other at a given space (s) between each side edge thereof, and rows of elements respectively attached onto a main surface of the side edge of each of the fastener tapes;
 extruding a polyester resin having a melt viscosity at 200° C. of 50 to 3000 dPa·s from an outlet of a die at 150 to 250° C. to apply the polyester resin onto a main surface of each of the fastener tapes that is opposite to the main surface having each of the attached rows of the elements, and onto the space (s), by curtain coating; and then
 passing the fastener chain with the applied polyester resin, between a metal roll heated at 100° C. to 250° C., which is arranged on a side of the polyester resin applied surface, and a roll having a hardness of 5 to 50° (JIS K 6253: 2006), which is arranged on a side of the polyester resin non-applied surface, while applying a pressure of 0.1 to 10.0 MPa; and then
 cooling and curing the polyester resin on the fastener chain.

In one embodiment of the method for manufacturing the waterproof fastener chain according to the present invention, a pressure applied onto the main surface of each of the fastener tapes by the polyester resin when the polyester resin is applied by the curtain coating is 1 MPa or less.

In another embodiment of the method for manufacturing the waterproof fastener chain according to the present invention, a distance (g) from the outlet of the die to the main surface of each of the fastener tapes onto which the polyester resin is applied by the curtain coating is from 0.1 to 2.0 mm.

In yet another embodiment of the method for manufacturing the waterproof fastener chain according to the present invention, the roll arranged on the side of the resin non-applied surface is made of a silicone resin.

In yet another embodiment of the method for manufacturing the waterproof fastener chain according to the present invention, the method is continuously carried out while conveying the fastener chain in the longitudinal direction.

In yet another aspect, the present invention provides a slide fastener comprising the fastener chain according to the present invention.

In yet another aspect, the present invention provides an article comprising the slide fastener according to the present invention.

Effects of the Invention

According to the waterproof fastener chain of the present invention, the following effects can be obtained:
(1) Since the fastener tape and the waterproof coated film are made of the same type of resin, the fastener chain has higher recyclability and is environmentally friendly.
(2) Because of higher adhesion of the fastener tape to the waterproof coated film, waterproof performance required for the waterproof slide fastener can be ensured with high reliability. The fastener tape has an improved appearance because discoloration due to lifting-up of the waterproof coated film can be suppressed thanks to the higher adhesion.
(3) Since the waterproof coated film does not deeply penetrate into the gap between the pair of fastener tapes, occurrence of trouble such as breakage of the waterproof coated film due to sliding of the slider can be suppressed. Also, flexibility of the fastener tape can be ensured, and sliding resistance of the slider can also be maintained at a lower level.
(4) Since it is not necessary to use any adhesive, working environments can be improved, and special facilities and education are not required.
(5) Since the waterproof coated film is formed directly on the fastener tape, the number of steps can be reduced and manufacturing costs can be reduced, as compared with the method for affixing the waterproof film by the adhesive.

MODES FOR CARRYING OUT THE INVENTION

Figure 1:
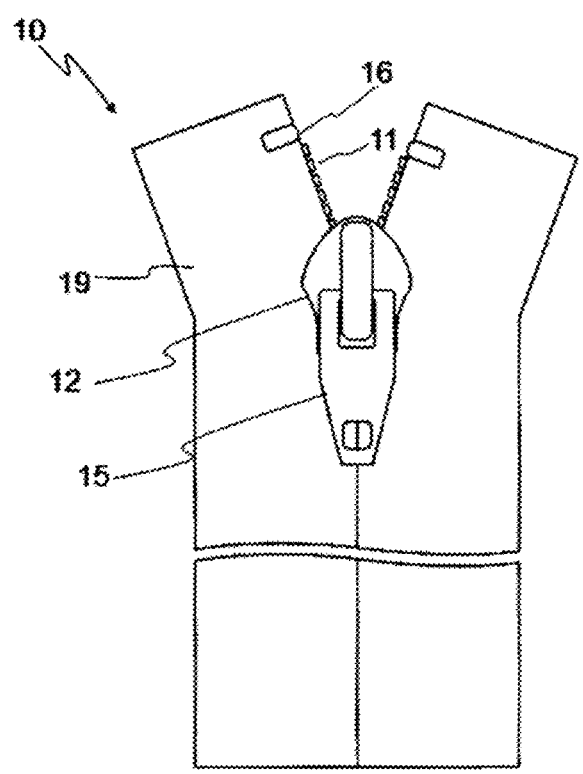
FIG. 1 is a plan view of a slide fastener according to an embodiment of the present invention.
Figure 2:
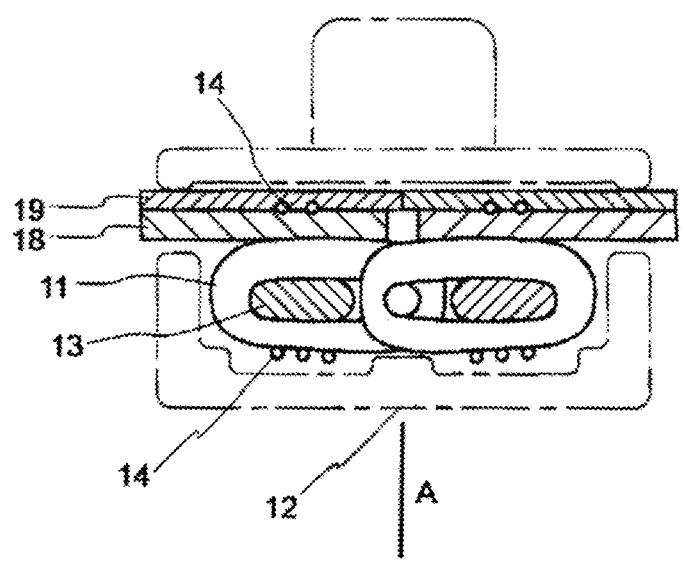
FIG. 2 is a cross-sectional view of a slide fastener according to an embodiment of the present invention.
Figure 3:
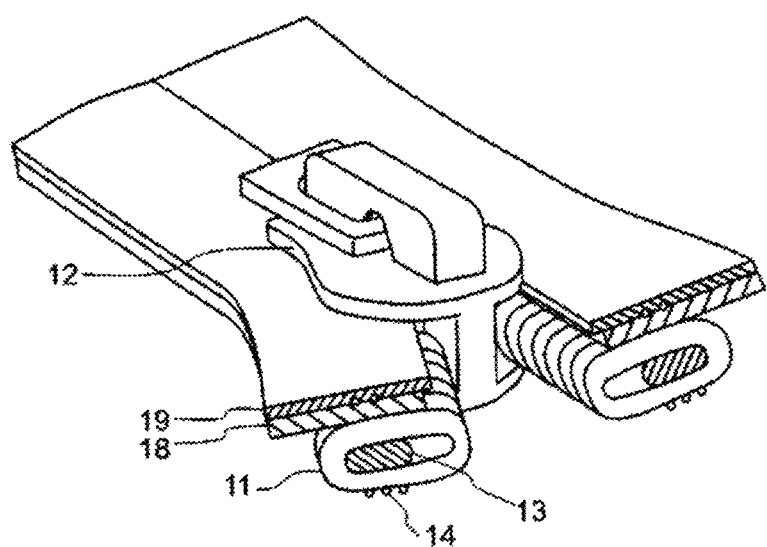
FIG. 3 is a perspective cross-sectional view of a slide fastener according to an embodiment of the present invention.
Figure 4:
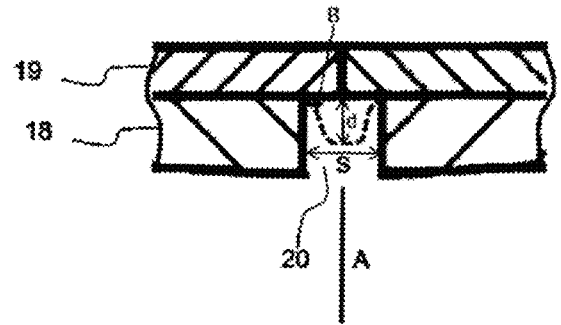
FIG. 4 is a partially enlarged view of FIG. 2.

FIGS. 1 to 4 show an example of a waterproof slide fastener 10 comprising a waterproof fastener chain according to the present invention. FIG. 1 is a plan view of the entire waterproof slide fastener 10, FIG. 2 is a cross-sectional view showing a state where rows of fastener elements 11 have been engaged in the slider 12, and FIG. 3 is a perspective cross-sectional view of a part of the waterproof slide fastener 10. FIG. 4 is a partially enlarged view of FIG. 2.

An article in which a row of elements have been attached to each fastener tape is referred to as a fastener stringer. Also, an article in which the elements of the respective fastener stringers have been engaged with each other is referred to as a fastener chain. In addition, an article in which parts such as a slider, upper and lower stoppers have been attached to the fastener chain is referred to as a slide fastener.

Referring to FIG. 4, the pair of fastener tapes 18 are adjacent at a given space (s) between each side edge thereof. The reason why the space is provided between the both edges is to improve slidability. The space may be zero, but if the space is too narrow, the adjacent portions will be partially in contact with each other and elevated, so that the slidability of slider may be impaired. Therefore, the space is preferably 30 µm or more, and more preferably 50 µm or more, and even more preferably 100 µm or more. Further, if the space is too wide, a waterproof property after the reciprocating opening and closing test will deteriorate. Therefore, the space is preferably 600 µm or less, and more preferably 500 µm or less, and even more preferably 400 µm or less. To facilitate the opening and closing operation of the slide fastener, one side edge of each of the fastener tapes 18 may be linear, and the space between the both edges may be substantially constant. As a non-limiting example, the fastener tape is generally in the form of an elongated rectangle.

In the present invention, the fastener tape 18 may be made of polyester resin. The fastener tape 11 can be manufactured by weaving or knitting fibers made of the polyester resin. Types of the polyester resin used for the fastener tape are not particularly limited. The polyester resin is a resin having repeating structures in which a dicarboxylic acid or its ester derivative component is linked to a diol component such as an aliphatic diol, an alicyclic diol, and an aromatic diol by an esterification reaction.

Examples of the dicarboxylic acid include aromatic dicarboxylic acids and aliphatic carboxylic acids. Examples of the aromatic dicarboxylic acids include terephthalic acid, isophthalic acid, phthalic acid, 1,5-naphthalenedicarboxylic acid, 2,7-naphthalenedicarboxylic acid, and 2,6-naphthalenedicarboxylic acid. Examples of the aliphatic dicarboxylic acids include succinic acid, adipic acid, suberic acid, sebacic acid, and dodecadioic acid. Examples of the ester derivative components include alkyl esters and acid halides of these acids. Examples of the aliphatic diol include ethylene glycol, propylene glycol, butylene glycol, hexylene glycol, neopentyl glycol, 2-methyl-1,3-propanediol, diethylene glycol and triethylene glycol. Examples of the alicyclic diol include cyclohexanediol and 1,4-cyclohexanedimethanol. Examples of the aromatic diol include 4-bisoxyethoxybenzene and bisphenol A. Further examples of the diol include polymeric diols such as polyethylene glycol, polytetramethylene glycol and polyhexamethylene glycol. These acid components and diol components may be used in combination, respectively.

Specific examples of the polyester resin include a polyethylene terephthalate (PET) resin, polytrimethylene terephthalate (PTT), polybutylene terephthalate (PBT), polyethylene naphthalate (PEN), polybutylene naphthalate (PBN), or materials selected from combinations thereof. Among these, the polyethylene terephthalate (PET) resin may be preferred because it has both of good mechanical strength and good dyeability. The polyester resin may optionally contain conventional additives such as dyes, pigments, heat-resistant stabilizers, weathering resistant agents, anti-hydrolysis agents, antioxidants and the like.

Rows of elements 11 are respectively attached onto one main surface of each of the fastener tapes 18 along one side edge thereof. A slider 12 is inserted between the rows of the right and left fastener elements 11 so that the opening and closing state of the slide fastener 10 can be controlled by sliding the slider 12. Further, an upper stopper 16 can be provided as shown in FIG. 1, and a lower stopper, an opening and separating fitting and the like can be attached, although not shown.

In this embodiment, the row of linear type, coil-shaped fastener elements 11 into which a core thread 13 has been inserted is sewn onto each of the fastener tapes by sewing thread 14. Double ring stitch by means of a sewing machine is herein applied to the sewing thread 14. The row of the coil-shaped fastener elements 11 can be formed from a monofilament of a synthetic resin such as polyamide and polyester, and preferably the polyester resin in terms of enhancing recyclability. Materials of the slider 12, the sewing thread 14 and other parts are also not particularly limited, but the polyester resin can further enhance the recyclability.

Waterproof coated films 19 made of polyester resin are respectively formed on the other main surface of each of the fastener tapes 18. The polyester resin used for the waterproof coated film 19 is preferably a polyester resin having a melt viscosity at 200° C. of 50 to 3000 dPa·s such that the polyester resin can be extruded from a die to be curtain-coated. The melt viscosity at 200° C. of 50 dPa·s or more, and preferably 100 dPa·s or more, and more preferably 200 dPa·s or more can prevent any excessive flow rate of the molten resin and protrusion of the molten resin from the width of the fastener tape, and also improve film thickness controllability. Further, the melt viscosity at 200° C. of 3000 dPa·s or less, and preferably 2000 dPa·s or less, and more preferably 1000 dPa·s or less can prevent the flow rate from becoming excessively low and decreasing the forming speed of the coated film, and prevent an increased load on the extruder or die and further suppress the pressing of resin against the fastener tape during the curtain coating.

The melt viscosity can be controlled by adjusting the molecular weight. The melt viscosity can also be controlled by the structure of the acid component and the diol component which constitute the polyester resin. The increasing number of branched structures in the constituent components can decrease the melt viscosity, and the increasing number of long straight chain structures can increase the melt viscosity. The acid component and the diol component forming the polyester resin of the waterproof coated film 19 may be the same as or different from the polyester forming the fastener tape. Further, the polyester resin of the waterproof coated film 19 may optionally contain commonly used additives such as dyes, pigments, heat-resistant stabilizers, weathering agents, ant-hydrolysis agents, and antioxidants.

In the present invention, the melt viscosity is measured by the following method: the measurement is carried out by preheating a sample at 200° C. for 15 minutes and then measuring a viscosity value at 200° C. using a B type viscometer according to JIS K 7117-1 (1999).

The waterproof coated film 19 can extend in the longitudinal direction and the short direction of the fastener tape 18 to cover the entire main surface. An outer surface of the waterproof coated films 19 is flat, at least at a position where the slider 12 is to pass over. This is because smoothly sliding of the slider 12 is facilitated. Although the outer surface of the waterproof coated film 19 at a position where the slider 12 is not to pass over may be uneven, the entire outer surface of the waterproof coated film 19 may be preferably flat in terms of ease of production and aesthetic appearance.

To effectively produce the waterproof function, it is preferable that the side having the waterproof coated film 19 is arranged outside and the row of the fastener elements 11 is arranged inside when attached to an article. A pull tab 15 of the slider 12 is preferably attached to the outside in view of ease of opening and closing operation.

Since the fastener tape 18 is made of fibers, fine irregularities due to gaps among the fibers are formed on the main surface of the fastener tape 18. The waterproof coated film 19 penetrates into the irregularities at an interface with the fastener tape 18, thereby producing an anchor effect and ensuring adhesive strength between the fastener tape 18 and the waterproof coated film 19. In order to obtain improved adhesive strength, the waterproof coated film 19 has preferably a depth penetrating into the irregularities on the surface of the fastener tape 18 at the interface with the fastener tape 18, of 80 μm or more, and more preferably 90 μm or more, and even more preferably 100 μm or more. However, if the melt viscosity of the molten resin is lowered or the heating temperature is increased so as to allow the waterproof coated film to deeply penetrate into the irregularities, a penetration depth (d) of the waterproof coated films 19 into a gap 20 caused by the space (s) of the pair of fastener tapes 18 will be larger as described below. Therefore, the waterproof coated film 19 has preferably the depth penetrating into the irregularities on the surface of the fastener tape 18 at the interface with the fastener tape 18, of 400 μm or less, and more preferably 300 μm or less, and more preferably 200 μm or less.

In the present invention, the depth of the waterproof coated films 19 penetrating into the irregularities on the surface of each of the fastener tapes 18 at the interface with each of the fastener tapes 18 is measured by the following method: first, the fastener chain is cut at intervals of 20 mm or more in the longitudinal direction to form six samples each having a square of 5 mm, including holes generated in the fastener tape by the sewing thread 14 of the coil element, and the cut samples are then imaged using a microfocus X-ray fluoroscopy/CT apparatus (e.g., "SMX 225 CT" available from Shimadzu Corporation). The measurement conditions of the microfocus X-ray fluoroscopy/CT apparatus are shown below:

SID: 600 mm (distance from an X-ray tube to an X-ray detector)
SOD: 22.8 mm (distance from an X-ray tube to the center of turntable)
VOXEL SIZE: 0.012 mm
Voltage of X-ray tube: 90 kV
Current of X-ray tube: 40 μA
Number of views: 1200
Average number: 10
Slice thickness: 0.013 mm
Image size: 512×512 pixels.

The microfocus X-ray fluoroscopy/CT apparatus has an X-ray tubular bulb for emitting an X-ray, an X-ray detector for detecting the X-ray, and a rotary table for placing and rotating an object to be measured. The measurement of the length from the surface of the fastener tape to the tip of the resin penetrating into the hole generated in the fastener tape by the sewing thread may largely vary due to waviness of the fibers. Therefore, using the CT image obtained by the imaging, a length from the surface of the waterproof coated film to the tip of the resin penetrating into the hole generated in the fastener tape by the sewing thread is measured. Then, the film thickness of the waterproof coated film from the surface of the coated film at a portion which has no sewing thread and which is 1 mm or more away from the center of the hole, to the surface of the fastener tape is measured at three or more positions, and an average value thereof is subtracted from the above length. Such measurement is performed for the six cut samples, and an average value thereof is defined as a measured value of the depth of the waterproof coated films 19 penetrating into the irregularities on the surface of each of the fastener tapes 18 at the interface with each of the fastener tapes 18.

Referring to FIG. 4, the waterproof coated films 19 may penetrate into the gap 20 caused by the space (s) between the opposing fastener tapes 18. This figure shows a situation where the waterproof coated films 19 penetrate into the gap 20, by a dotted line B, as an example. In the present invention, the penetration depth (d) of the waterproof coated films 19 is suppressed to be equal to or less than the thickness of the fastener tapes 18 such that the waterproof coated films 19 are not in contact with the rows of the elements 11. This is because if the waterproof coated films 19 penetrate to such an extent that the waterproof coated films 19 are in contact with the rows of the elements 11, the waterproof coated films 19 will tend to be broken by undergoing friction with the sliding of the slider. Further, when cutting the waterproof coated film 19 within the gap 20 between the pair of the fastener tapes 18 to separate it into two parts, the forming of the waterproof coated films 19 onto the gap 20 will increase the thickness of the waterproof coated film 19 to be cut, and will thus cause a problem that the cut positions fluctuate and it is difficult to clearly cut the waterproof coated film at the center part. Considering that the thickness of fastener tape 18 is typically from 300 to 700 µm, the penetration depth (d) of the waterproof coated films 19 is preferably 400 µm or less, and more preferably 300 µm or less, and even more preferably 200 µm or less, for example, from 0 to 400 µm.

In the present invention, the penetration depth (d) of the waterproof coated films 19 is measured by the following method: first, five samples each having a square of 5 mm, including the gap 20, is cut from the fastener chain at intervals of 20 mm or more in the longitudinal direction, and the cut fastener chain is then measured using a microfocus X-ray fluoroscopy/CT apparatus (e.g., "SMX225CT" available from Shimadzu Corporation). The measurement conditions of the microfocus X-ray fluoroscopy/CT apparatus are shown below:
SID: 600 mm (distance from an X-ray tube to an X-ray detector)
SOD: 22.8 mm (distance from an X-ray tube to the center of turntable)
VOXEL SIZE: 0.012 mm
Voltage of X-ray tube: 90 kV
Current of X-ray tube: 40 µA
Number of views: 1200
Average number: 10
Slice thickness: 0.013 mm
Image size: 512×512 pixels.

The microfocus X-ray fluoroscopy/CT apparatus has an X-ray tubular bulb for emitting an X-ray, an X-ray detector for detecting the X-ray, and a turntable for placing and rotating an object to be measured. Using the CT image obtained by the imaging, the penetration depth (d) of the waterproof coated films was measured on three positions at intervals of 1 mm in the longitudinal direction of the fastener chain, and an average value thereof was calculated. Such measurement is carried out for the five cut samples and an average value for the five samples is defined as a measured value of the penetration depth (d) of the waterproof coated films.

In a state where the fastener chain has been closed, each of the waterproof coated films 19 formed on the main surface of each of the fastener tapes 18 has an edge extending from the side edge of each of the fastener tapes 18 in a direction approaching each other to contact each other. This can allow the waterproof property to be ensured. The contacting of the edges of the waterproof coated films 19 near an engaging center line A of the rows of the elements provides an advantage of having smoothed sliding of the slider 12.

The thickness of the waterproof coated films 19 is preferably 50 µm or more, and more preferably 100 µm or more, in terms of enhancing wear resistance and scratch resistance. Further, the thickness of the waterproof coated films 19 is preferably 350 µm or less, and more preferably 300 µm or less, and even more preferably 200 µm or less, in terms of preventing a decrease in flexibility of the fastener tape and of preventing generation of depressions on the outer surface by an impact.

In the present invention, the thickness of the waterproof coated films 19 is measured by the following method: first, 16 samples each having a square of 5 mm are cut from the fastener chain at intervals of 20 mm or more in the longitudinal direction and at intervals of 5 mm in the width direction, and the cut samples are imaged using a microfocus X-ray fluoroscopy/CT apparatus (e.g., "SMX225CT" available from Shimadzu Corporation). The measurement conditions of the microfocus X-ray fluoroscopy/CT apparatus are shown below:
SID: 600 mm (distance from an X-ray tube to an X-ray detector)
SOD: 22.8 mm (distance from an X-ray tube to the center of turntable)
VOXEL SIZE: 0.012 mm
Voltage of X-ray tube: 90 kV
Current of X-ray tube: 40 µA
Number of views: 1200
Average number: 10
Slice thickness: 0.013 mm
Image size: 512×512 pixels.

The microfocus X-ray fluoroscopy/CT apparatus has an X-ray tubular bulb for emitting an X-ray, an X-ray detector for detecting the X-ray, a turntable for placing and rotating an object to be measured. Using the CT image obtained by the imaging, the thickness of the waterproof coated films was measured on three positions at intervals of 1 mm in the longitudinal direction of the fastener chain, and an average value thereof was calculated. Such measurement is carried out for the 16 cut samples, and an average value for the 16 samples is defined as a measured value of the thickness of the waterproofing coated films.

Partially weak adhesion of the fastener tape to the waterproof coated film 19 may cause a phenomenon that the waterproof coated film 19 peels off and is lifted up from the fastener tape 18. However, in the present invention, the fastener tape 18 has higher adhesion of the fastener tape 18 to the waterproofing coated film 19, so that such lifting-up can be suppressed. In one embodiment of the fastener chain according to the present invention, the number density of portions where the waterproof coated films 19 are lifted up from the fastener tapes 18 may be $1/100$ $cm^2$ or less, and preferably $0.1/100$ $cm^2$ or less, and more preferably $0.01/100$ $cm^2$ or less.

In the present invention, the number density of the portions where the waterproof coated films 19 are lifted up from the fastener tapes 18 is measured by the following method: a slide fastener having a width of 3.2 cm or more, a length of 15.6 cm or more and an area of 50 $cm^2$ or more is prepared, and the slider fastener is subjected to a washing and laundering test according to a laundering method defined in JIS L 0844 method A-2. Portions having poor adhesion lifts up by the laundering. A surface state of the slide fastener after the washing and laundering test is observed by an inspection loupe of ten magnifications, the number of lifting-up portions each having an area of 0.1 $mm^2$ or more is counted, and an average value per 100 $cm^2$ is calculated.

One or more of the core thread, sewing thread and elements may be subjected to a water repellent treatment. The water repellent treatment includes a method of applying a water repellent agent to a surface of a target component. For the fastener tape, the water repellent agent can be applied onto the waterproof coated film as described above.

Examples of the water repellent agent that can be used include fluorine compounds, silicone compounds, acrylic water repellent agents, silicone composite-based water repellent agents, paraffinic compounds, ethylene urea-based compounds, zirconium-based compounds, fatty acid amide compounds, methylolamide-based compounds, alkyl urea-type and fatty acid amide-type water repellant agents.

Examples of the water repellent agents of the fluorine compounds that can be used include poly(pentadecafluorooctyl acrylate), poly(trifluoroethyl acrylate), tetrafluoroethylene-hexafluoropropylene copolymers, etc., and perfluorolauric acid, polytetrafluoroethylene, perfluoro-n-alkyl acrylate, polyvinylidene fluoride, pentadecanebutylethyl methacrylate and hexafluoropropylene, etc.

Further, other examples of the water repellent agents of the fluorine compounds that can be used include copolymers of two or more olefins containing fluorine atoms, and copolymers of an olefin containing a fluorine atom(s) and a hydrocarbon monomer. In addition, it is preferable that the water repellent agent is applied to the woven or knitted fabric, together with a binder resin, in order to enhance durability of water repellency.

Examples of the silicone compounds that can be used include polydimethylsiloxane, methylhydrogen polysiloxane, various modified silicones such as amino-modified, epoxy-modified, carboxyl-modified, quaternary ammonium salt-modified, higher alkyl-modified and fluorine-modified silicones, and a silicone-based water repellent agent consisting of methylhydrogen polysiloxane and a curing-accelerating catalyst such as aromatic compounds, for example, toluene and xylene, n-hexane and n-heptane. The silicone-based water repellent agent have advantages that (1) a contact angle to water is larger and water repellency is outstanding, (2) it easily wets a substrate due to smaller surface tension and can form a uniform coated film, (3) it has gas permeability and (4) it has good durability and improved laundering fastness and dry cleaning fastness.

Further, examples of the silicone-based water repellent agents that can be used include a room-temperature curable aqueous silicone emulsion composition that can be cured at room temperature by removing of water to provide an elastomeric cured product, such as a silicone emulsion consisting of anionically stabilized and hydroxyl group-containing diorganopolysiloxane, colloidal silica and a curing catalyst, as described in Japanese Patent Application Public Disclosure (KOKAI) No. S58-118853 A1 or Japanese Patent Application Public Disclosure (KOKAI) No. S60-96650 A1; a silicone emulsion consisting of ionically or non-ionically stabilized and alkoxy group-containing diorganopolysiloxane and a titanium catalyst, as described in Japanese Patent Application Public Disclosure (KOKAI) No. H07-150045 A1.

Further, in order to improve durability of the water repellent agent, a crosslinking agent can be used in combination with the above compounds. The crosslinking agent that can be used includes a melamine resin, a blocked isocyanate-based resin, and an imine-based resin.

Moreover, in order to improve durability of the water repellent agent, a binder resin may be included together with the above compounds. The binder resin that can be used includes an acrylic resin, a urethane resin and a silicone resin.

The crosslinking agent and the binder resin may be mixed and the mixture may be used. In this case, the treatment solution can be used in the form of a mixed solution of a polyfluoroalkyl group-containing acrylic copolymer and an aminoplast resin or a polyfunctional blocked isocyanate-containing urethane resin.

Next, an example of the method for manufacturing the waterproof fastener chain according to the present invention are described with reference to FIG. 5. First, a fastener chain 21 is prepared, which comprises a pair of fastener tapes made of polyester resin adjacent to each other at a given space (s) between each side edge thereof and rows of elements respectively attached onto a main surface of the side edge of each of the fastener tapes. The parts forming the fastener chain are as described above.

A polyester resin 22 having a melt viscosity at 200° C. in the above range is then extruded from an outlet of a die 23 at 150 to 250° C., and the polyester resin 22 is applied onto a main surface of each of the fastener tapes, which is opposite to the main surface having each of the attached rows of elements, and onto the above space (s), by curtain coating. The extrusion of polyester resin may be performed such as by a conventional extrusion process using an extruder 24 and the die 23. The reason why the melt viscosity at 200° C. of the polyester resin 22 is set to the above range is as previously described. The reason why the temperature of the polyester resin 22 at the outlet of the die 23 is set to 150° C. or higher is to render the resin a coatable viscosity. The temperature of the polyester resin at the die outlet is preferably 170° C. or higher, and more preferably 190° C. or higher. The reason why the temperature of the polyester resin at the die outlet is set to 250° C. or less is that heat deterioration of the resin is avoided. The temperature of the polyester resin at the die outlet is preferably 230° C. or lower, and more preferably 210° C. or lower.

One of features of the present invention is to apply the polyester resin onto the main surface of the fastener tape by the curtain coating. Since the polyester resin which has just been discharged from the die outlet has an elevated temperature and relatively higher fluidity, the polyester resin easily penetrates into the space when forced into the fastener tape at a high pressure. However, in the case of curtain coating, the molten polyester resin discharged from the die outlet arrives at the main surface of the fastener tape after the pressure during the discharge has been released in the air, so that pressing force against the main surface of the fastener tape from the polyester resin can be reduced. This can prevent the polyester resin from penetrating into the gap caused by the space (s) provided between a pair of the fastener tapes, to an inconvenient extent.

Further, the curtain coating of polyester resin having the given melt viscosity allows the polyester resin having a desired shape and dimension to be laminated on the fastener tape. Therefore, the polyester resin can be applied in a desired thickness and width depending on the shape and dimension of the die outlet, and also applied with uniform thickness in the form of strip. Advantageously in industrial production, the curtain coating can be carried out while conveying the fastener chain in the longitudinal direction.

The die outlet preferably extends over the entire width direction of the pair of fastener tapes. This can lead to the formation of waterproof coated film continuous in the width direction on the main surface of the pair of fastener tapes. Further, the thickness of polyester resin to be coated onto the fastener tape can be controlled by adjusting a slit width (w) of the die outlet. The slit width (w) is preferably 0.01 mm or more, and more preferably 0.05 mm or more, and even more preferably 0.1 mm or more, in order to maintain the strength of resin layer. Also, the slit width (w) is preferably 0.8 mm or less, and more preferably 0.4 mm or less, and even more preferably 0.25 mm or less, in order to prevent an increase in weight and a decrease in flexibility due to thickening of the resin layer.

According to the curtain coating, a pressure applied onto the main surface of each of the fastener tapes by the polyester resin discharged from the die outlet can be 1 MPa or lower, and if the pressure is within this range, the polyester resin can be effectively prevented from deeply penetrating into the gap between the pair of the fastener tapes. The pressure is preferably 0.8 MPa or lower, and more preferably 0.5 MPa or lower. However, if the pressure applied onto the main surface of the fastener tape by the polyester resin discharged from the die outlet is too low, the resin will not penetrate into the fibers of the fastener tape so that the degree of adhesion may be reduced. Therefore, the pressure is preferably 0.1 MPa or higher, and more preferably 0.2 MPa or higher.

In the present invention, such a pressure is measured by installing a pressure gauge under the fastener tape, continuously supplying the resin and measuring the pressure applied onto the fastener tape.

Figure 5:
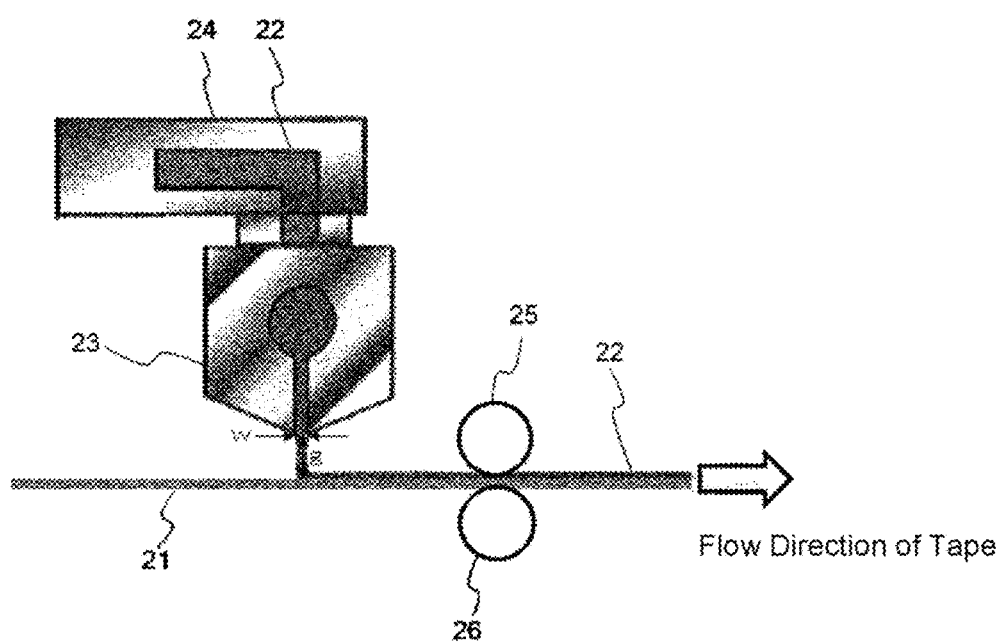
FIG. 5 shows an example of a device configuration for forming a waterproof coated film on a fastener chain.

The pressure applied onto the main surface of the fastener tape by the polyester resin discharged from the die outlet can be controlled by adjusting a distance (g) from the die outlet to the main surface of each of the fastener tape to be curtain-coated with the polyester resin, as shown in FIG. 5. Such a distance (g) may be, for example, 0.1 to 2.0 mm. The distance (g) is preferably 0.1 mm or more, and more preferably 0.3 mm or more, and even more preferably 0.5 mm or more, in terms of preventing the die from being contacted with the fastener tape having the irregularities on the surface. The distance (g) is preferably 2.0 mm or less, and more preferably 1.5 mm or less, and still more preferably 1.0 mm or less, in terms of maintaining the shape discharged from the die outlet.

As shown in FIG. 5, once the polyester resin 22 has been applied onto the major surface of the fastener tape by the curtain coating, the fastener chain is passed between a metal roll 25 heated at 100 to 250° C. arranged on the polyester resin applied surface side and a roll 26 having a hardness of 5 to 50° arranged on the polyester resin non-applied surface side, under a pressure of 0.1 to 10.0 MPa. This step allows the polyester resin to moderately penetrate into fine irregularities on the main surface of the fastener tape, so that improvement of adhesive strength can be achieved due to an anchor effect. Advantageously in industrial production, this step can be continuously conducted while conveying the fastener chain in the longitudinal direction, after the curtain coating.

The reason why the metal roll 25 is used on the polyester resin applied surface side is because improved mechanical strength, heat resistance and smoothness can be obtained, as well as the polyester resin applied onto the fastener tape is hard to stick to the rolls. By heating the roll 25 to 100 to 250° C., the polyester resin is softened to further penetrate into the fine irregularities of the fastener tape so that a stronger anchor effect can be obtained. The heating temperature of the roll 25 is preferably 120° C. or higher, and preferably 150° C. or higher, in order to promote softening of the polyester resin. Further, the heating temperature of the roll 25 is preferably 220° C. or lower, and more preferably 200° C., in terms of preventing thermal degradation of the polyester resin.

The use of the soft roll 26 having a hardness of 5 to 50° on the polyester resin non-applied surface (fastener tape) side can further promote adhesion of the polyester resin to the fastener tape, thereby reducing any adhesion failure portion, because as the fastener chain is passed onto the roll, the surface of the roll is deformed following the fine irregularities on the main surface of the fastener tape. The reason why the hardness of the roll was 5° or more is to prevent plastic deformation that will be caused by an excessively soft roll. The hardness is preferably 7° or more, and more preferably 10° or more. Further, the reason why the hardness of the roll is 50° or less is to prevent inhibition of the following of the fine irregularities due to an excessively hard roll. The hardness is preferably 40° or less, and more preferably 30° or less. Materials having the hardness within such a range include, but not limited to, silicone resins, Teflon resins, and rubber rolls, and the silicone resins are preferred for the reason that flexibility can be maintained for an extended period of time.

In the present invention, the hardness of the roll is measured by the following method: the hardness is measured by pressing a durometer on the roll surface, according to JIS K6253 (2006).

There is no need to heat the roll 26 arranged on the polyester resin non-applied surface (fastener tape) side. This is because the possibility of thermal deformation of the fastener tape itself is considered for the reason that if heating the roll on the fastener tape side, the tape on which the resin is not coated is directly heated.

A pressure when the fastener chain with the polyester resin applied is passed between these rolls is preferably 0.5 MPa or more, and preferably 1.0 MPa or more, and still more preferably 1.5 MPa or more, in terms of intimately contacting the rolls with the resin coat surface. Such a pressure is preferably 10 MPa or less, and more preferably 5 MPa or less, and still more preferably 2 MPa or less, in terms of preventing leakage of the resin layer that will be caused by an excessively high pressure.

In the present invention, the pressure during the passing between the rolls is measured by sandwiching the fastener tape between the rolls, and measuring the pressure pressing the roll on the polyester resin side by the roll on the fastener tape side, using a Bourdon tube pressure gauge according to JIS B7505 (1999).

Then, the polyester resin on the fastener chain is cooled and cured, so that the waterproof coated film will be firmly fixed on the main surface of the fastener tape. As the cooling conditions, air can be blown on the tape surface to cool the polyester resin. If the resin is drastically cooled, excessive deformation will occur due to shrinkage. Therefore, in order to prevent this, an air blowing speed at this time is preferably 30 m/s or less, and more preferably 20 m/s or less, and even more preferably 10 m/s or less. Advantageously in industrial production, such a cooling step can also be continuously conducted while conveying the fastener chain in the longitudinal direction, after pressing by the rolls.

In the present invention, the air blowing speed is measured by an anemometer according to JIS T8202 (1997).

Then, the waterproof coated film formed on the space (s) of the fastener chain is cut within the range. The waterproof coated film is preferably cut along the center line A of the space. The cutting may be carried out by using, for example, a slitter machine (not shown). Advantageously in industrial production, such a cutting step can also be continuously conducted while conveying the fastener chain in the longitudinal direction.

The waterproof slide fastener according to the present invention can be suitably used as an opening and closing fixture for daily necessaries such as clothing items, bags, shoes and sundries, as well as protective clothing items such as space suits, chemical protective clothing, diving suits, lifeboats and survival suits, covers for transportation containers, and tents, and the like.

EXAMPLES

Figure 6:
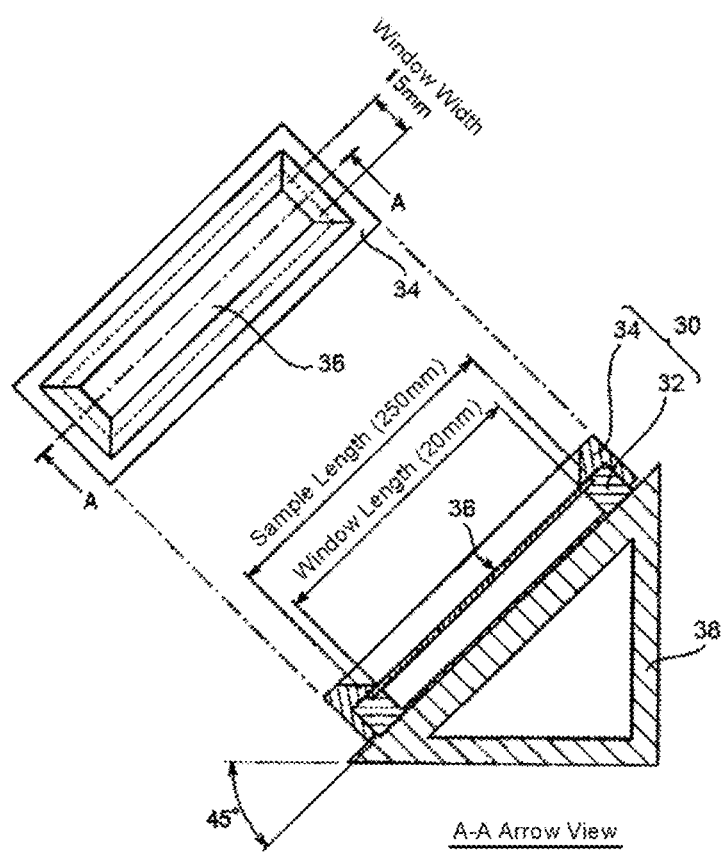
FIG. 6 shows a plan view and a side cross-sectional view (taken along the line A-A) of a fixing jig of a sample used for a rain test B method.

For better understanding of the present invention and its advantages, Examples are presented below, but the present invention is not limited to these examples.
(1. Preparation of Fastener Chain)
For each test sample, two elongated fastener tapes made of polyester resin, each having a tape width of 16.5 mm and a tape thickness of 0.610 mm were prepared, and a coiled element row was sewn on a side edge of each fastener tape, and the opposing element rows were engaged with each other to assemble a fastener chain. The sewn position of the element row was then finely adjusted such that the space (s) of the tape was set to each space as described in Table 1.
(Samples 1 to 26: Formation of Waterproof coated Film by Curtain Coating)
Using the curtain coating apparatus having the structure shown in FIG. 5, the fastener chain being conveyed in the longitudinal direction was continuously subjected to the applying of the polyester resin and the roll pressing. In this case, the conveying speed of the fastener chain was 10 m/min, the temperature of the die outlet was 200° C., and the slit width (w) of the die outlet was 33 mm. Depending on the test samples, the distance (g) from the die outlet to the main surface of the fastener tape, the melt viscosity at 200° C. of the polyester resin, the discharge amount of the polyester resin and the pressure applied onto the main surface of the fastener tape by the resin during the curtain coating were varied as described in Table 1. The melt viscosity of the polyester resin was varied by changing the molecular weight. Specifically, the number average molecular weights Mn of samples 1 to 12 and 19 to 26 were about 20,000, whereas samples 13 to 18 used polyester resins having different number molecular weights Mn (which were varied in the range of about 5,000 to about 200,000). Further, the roll pressing was performed by passing the fastener chain between the metal roll heated at 150° C. and the silicon roll having a hardness of 20° under a roll pressure of 1.7 MPa. The polyester resin was then cooled and cured by blowing air on the tape surface at an air blowing peed of 10 m/s.
(Sample 27: Formation of Waterproof Coated Film by Penetration as Described in Example 1 of Patent Document 3)
An apparatus having structures described in FIGS. 1 and 2 of Patent Document 3 (Japanese Patent No. 4312171 B1) was prepared, and the fastener chain being conveyed in the longitudinal direction was continuously subjected to penetration of a waterproof material made of liquid polyester resin and drying by heating according to the descriptions of Example 1 of Patent Document 3.
(2. Morphological Evaluation of Waterproof Coated Film)
For each test sample obtained, morphology of the water proof coated films was evaluated with respect to items (1) to (3). The evaluation procedure is as previously described, and the morphology was measured using a microfocus X-ray fluoroscopy/CT apparatus ("SMX225CT" available from Shimadzu Corporation). Results are shown in Table 1.
(1) Penetration depth (d) of the waterproof coated films into the space (s) caused by the pair of the fastener tapes
(2) Thickness of the waterproof coated films
(3) Depth of the waterproof coated film penetrating into the irregularities on the surface of the fastener tape at the interface with the fastener tape.
(3. Evaluation of Lifting-Up of Waterproof Coated Film)
The washing and laundering test was carried out according to JIS L 0844 method A-2, and the number density of portions where the waterproof coated films are lifted up from the fastener tapes was measured by the method as stated above.
(4. Reciprocating Opening and Closing Test)
The reciprocating opening and closing test involving 500 times opening and closing cycles with MH class was carried out in accordance with JIS S 3015 (2007). The tested samples were subjected to appearance evaluations. Appearance evaluation was conducted on the surface of the waterproof coated films over which the slider passed (observation area of 750 mm$^2$) and on the central gap portion forming the boundary between the left and right waterproof coated films (observation length of 75 mm) on the basis of criteria as shown below. Further, using the samples, the waterproof test was carried out to evaluate the waterproof property after the reciprocating opening and closing durability test.
(Surface Appearance)
◉: No scratch and no sliding trace were observed.
○: Slight scratches or sliding traces were observed.
Δ: Scratches and sliding traces were observed.
x: Film peeling was observed.
Note: Evaluations of ◉, ○ and Δ are acceptable as a product.
(Gap Appearance)
◉: No gap was observed.
○: Gap less than 0.5 mm was observed.
Δ: Gap of 0.5 mm or more and less than 1.0 mm was observed.
x: Gap of 1.0 mm or more was observed.
Note: Evaluations of ◉, ○ and Δ are acceptable as a product.
(5. Waterproof Test)
The waterproof test was carried out according to the rain test B method (see Annex JA of JIS L1092 (2009)). The fixing jig for the sample of the produced fastener chain will be described with reference to FIG. 6. FIG. 6 shows a plane view and a side cross-sectional view (taken along the A-A-line) of the fixing jig for the test sample used in the rain test B method.

Figure 8:
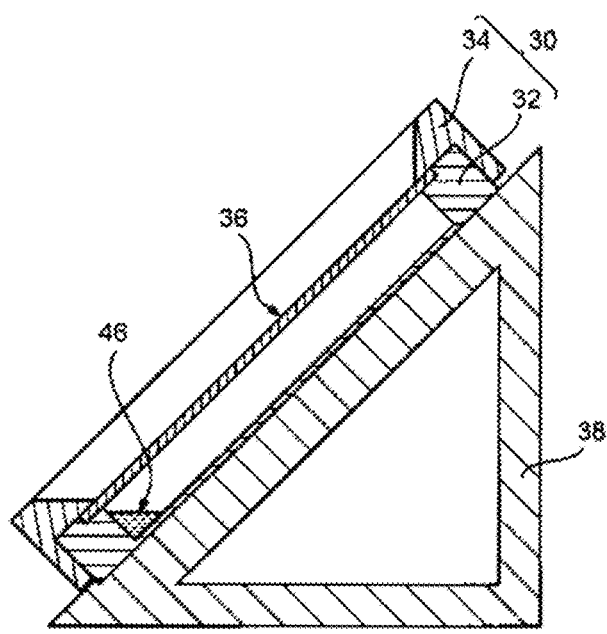
FIG. 8 shows that water which has permeated the sample by sprinkling of water has been collected inside a water storage member and a water pool has been present.

As shown in FIG. 6, the fixing jig 30 includes an opening member 34 having an opening window for applying water showering from above to the test sample 36, and a water storage member 32 which is provided with a reservoir for storing water permeating the test sample 36 and which is placed on the lower side of the opening member 34. The test sample 36 is used by sandwiching it between the opening member 34 and the water storage member 32. Further, in order to maintain a certain inclination while preventing the test sample 36 from going under water, the rain test is carried out by fixing the fixing jig 30 at an angle of 45 degrees using an angle fixture 38, in the rain test B method. As shown in FIG. 8, the opening window of the opening member 34 has a window length of 200 mm and a window width of 15 mm. Further, the length of the test sample 36 is 250 mm.

Figure 7:
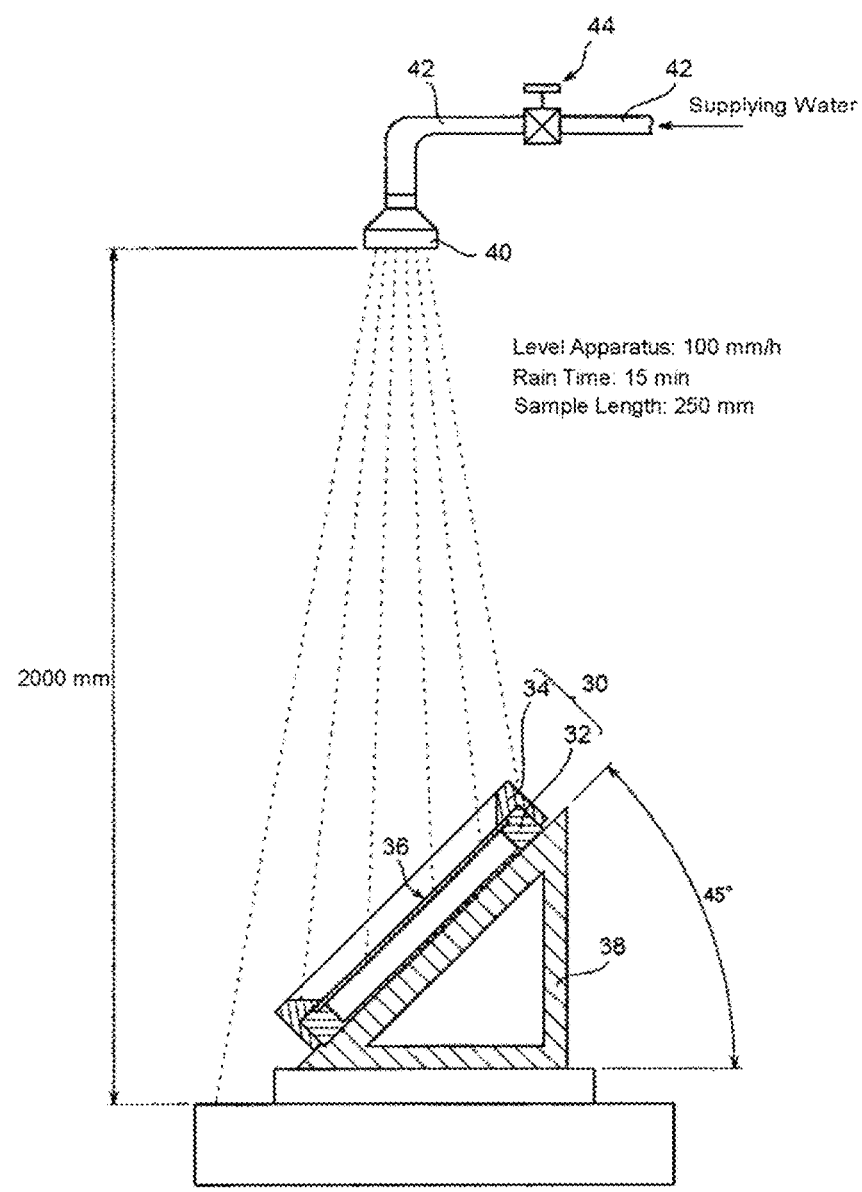
FIG. 7 shows an appearance of an artificial rainfall apparatus when implementing the rain test B method.

FIG. 7 is a view showing an appearance of an artificial rainfall apparatus used for carrying out the rain test B method. It should be noted that the fixing jig 30 and the angle fixture 38 are represented by cross section. As shown in FIG. 7, the fixing jig 30 fitted with the test sample 36 is placed on the angle fixture 38, and set at an angle of 45 degrees. A spray nozzle 40 for water sprinkling is placed at a position of 2000 mm above the fixing jig 30. The spray nozzle 40 is connected to a pipe 42 for supplying water, in which water is pumped. A water quantity adjusting valve 44 for adjusting the quantity of water to be sprinkled is arranged in the middle of the pipe 42.

When carrying out the rein test B method, the test sample 36 has been cut to a length of 250 mm and a mass ($M_0$) of the sample before testing has been weighed in advance. Then, the test sample 36 has been sandwiched in a certain position between the opening member 34 and the water storage member 32. At the same time, a blotting paper for absorbing water pooled within the water storage member 32 after the end of the test and for measuring the mass of water that has permeated the test sample 36 has been prepared, and an initial mass ($M_1$) of the blotting paper has been weighed.

Next, the fixing jig 30 that sandwiched the test sample 36 is placed on the angle fixture 38, set to an angle of 45 degrees and arranged at a position of 2000 mm below the spray nozzle 40. An amount of rainfall to 100 mm/h is then set by adjusting the water quantity adjusting valve 44 while observing the rain gauge. The sprinkling of water to the fixing jig 30 is then started, and the sprinkling of water is stopped after 15 minutes.

Once the sprinkling of water has been stopped, the test sample 36 is first removed from the fixing jig 30, and a mass ($M_2$) of the tested sample 36 is weighted. Furthermore, the blotting paper is immersed in a water pool 46 (see FIG. 8) collected inside the water storage member 32 so as to completely absorb water collected inside the water reservoir member 32. A mass ($M_3$) after the water absorption is weighted.

Next, the penetration amount is calculated by the equation: penetration amount (g)=$(M_2-M_0)+(M_3-M_1)$, to determine the amount of water penetrated by the rain test B method. FIG. 8 shows a state where water that has permeated the test sample 36 by sprinkling of water is collected inside the water storage member 32, so that the water pool 46 is present. For convenience of explanation, the fixing jig 30 and the angle fixture 38 are presented by cross section.

(6. Flexibility Test)

Figure 9:
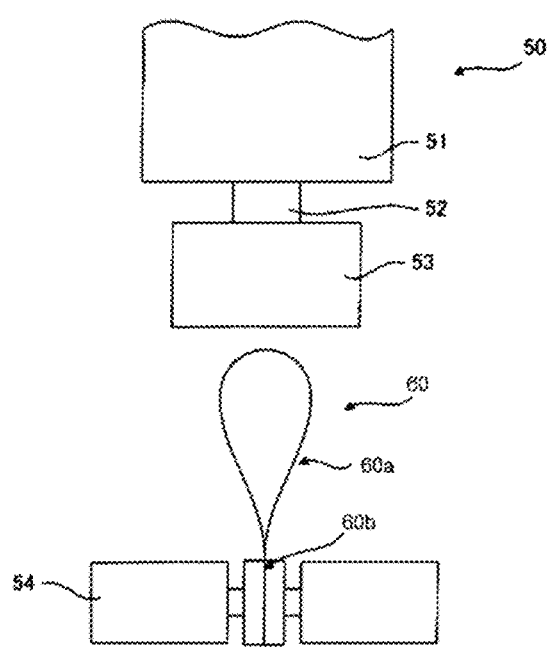
FIG. 9 shows a state before actuation of a flexibility testing apparatus.
Figure 10:
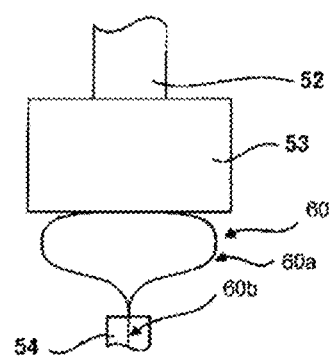
FIG. 10 shows an actuating state of the flexibility testing apparatus.

FIG. 9 shows a state before a flexibility test apparatus 50 is actuated. FIG. 10 shows a state where the fastener chain has pressurized by actuating the flexibility test apparatus 50. The test sample 60 of the slide fastener chain with the elements engaged, having a length of 120 mm or more, is bent near the central portion into a loop shape such that the coil elements are arranged on the inside, to form a loop portion 60a and form an overlapped portion 60b at both ends. The length of the loop portion 60a is 80 mm, and the length of the overlapped portion 60b is 20 mm or more. The overlapped portion 60b is preferably fixed by a tape or like.

As shown in FIG. 9, the flexibility test apparatus 50 used in the flexibility test comprises a moving member 51 that moves up and down, a load cell 52 for converting a load into an electric signal, the load cell 52 being attached to the moving member 51, and a pressurizer 53 for pressurizing the loop portion 60a of the test sample 60, the pressurizer 53 being attached to the load cell 52, and a clamp 54 for securing the overlapped portion 60b of the test sample 60.

The clamp 54 allows the loop portion 60a to protrude upward, and supports the test sample 60 while clamping the overlapped portion 60b. In this state, the moving member 51 is moved downward. As the moving member 51 is moved downward, the load cell 52 and the pressurizer 53 are also moved downward. Then, as shown in FIG. 10, the pressurizer 53 presses the loop portion 60a. After the moving member 51 is moved downward to a predetermined position, an operator determines the maximum load in the range of movement range of the load cell 52. Five tests were performed for one test sample, and each average value was determined.

(7. Sliding Resistance)

The sliding resistance was evaluated in accordance with JIS S 3015 (2007).

(Discussion)

Samples 1 to 25 are inventive examples. They suppressed fracture of the waterproof coated film caused by the reciprocating opening and closing of the slider, had lower sliding resistance and also had flexibility, because the waterproof coated film did not deeply penetrate into the gap between the pair of fastener tapes. Further, they showed higher waterproof performance because of higher adhesion of the fastener tape to the waterproof coated film. In particular, the sample 4 showed the best waterproof performance, because it had desirable values for all of the penetration depth (d) of the waterproof coated films into the gap caused by the space (s) between the pair of the fastener tapes, the thickness of the waterproof coated film and the depth of the waterproof coated film penetrating into the irregularities on the fastener tape at the interface with the fastener tape. On the other hand, the sample 26 showed poor adhesion of the waterproof coated film because the waterproof coated film did not penetrate into the inside of the fastener tape for the reason that no pressure was applied onto the fastener tape during the curtain coating of the polyester resin. As a result, a number of lifting-up portions were generated after the washing and laundering test, and increased breakage of the waterproof coated film was generated after the reciprocating opening and closing test. Further, the sample 27 is a comparative example corresponding to the prior art in which the waterproof material was penetrated inside the fastener tape. In this case, the flexibility of fastener tape was decreased because the waterproof material excessively penetrated into the interior portions. Also, the sliding resistance was increased, and the central gap portion forming the boundary of the left and right waterproof coated films was damaged by the reciprocating opening and closing test, and the waterproof property was deteriorated.

TABLE 1

| Test No. | Conditions for Forming Waterproof Coated Film | | | | | Morphological Evaluation of Waterproof Coated Film | | | Remarks |
|---|---|---|---|---|---|---|---|---|---|
| | Space (s) um | Distance (g) mm | Melt Viscosity at 200° C. dPa · s | Discharge Amount of Resin g/min | Tape Pressure MPa | Penetration Depth (d) um | Thickness of Coated Film um | Penetration into Irregularities um | |
| Sample 1 | 200 | 2.20 | 600 | 250 | 0.1 | 0 | 131 | 121 | Inventive |
| Sample 2 | 200 | 2.00 | 600 | 250 | 0.2 | 51 | 130 | 133 | Inventive |
| Sample 3 | 200 | 1.50 | 600 | 250 | 0.3 | 93 | 132 | 141 | Inventive |
| Sample 4 | 200 | 1.00 | 600 | 250 | 0.4 | 184 | 130 | 151 | Inventive |
| Sample 5 | 200 | 0.50 | 600 | 250 | 0.7 | 274 | 131 | 182 | Inventive |
| Sample 6 | 200 | 0.10 | 600 | 250 | 1.0 | 382 | 131 | 211 | Inventive |
| Sample 7 | 200 | 0.05 | 600 | 250 | 1.1 | 427 | 132 | 227 | Inventive |
| Sample 8 | 200 | 0.45 | 600 | 75 | 0.2 | 178 | 41 | 138 | Inventive |
| Sample 9 | 200 | 0.80 | 600 | 118 | 0.3 | 185 | 62 | 151 | Inventive |
| Sample 10 | 200 | 1.10 | 600 | 345 | 0.4 | 189 | 163 | 152 | Inventive |
| Sample 11 | 200 | 1.60 | 600 | 575 | 0.4 | 191 | 302 | 164 | Inventive |
| Sample 12 | 200 | 2.10 | 600 | 768 | 0.3 | 192 | 406 | 172 | Inventive |
| Sample 13 | 200 | 1.00 | 3200 | 250 | 0.7 | 133 | 131 | 57 | Inventive |
| Sample 14 | 200 | 1.00 | 2200 | 250 | 0.6 | 156 | 132 | 84 | Inventive |
| Sample 15 | 200 | 1.00 | 1200 | 250 | 0.5 | 179 | 130 | 93 | Inventive |
| Sample 16 | 200 | 1.00 | 150 | 250 | 0.3 | 199 | 132 | 251 | Inventive |
| Sample 17 | 200 | 1.00 | 70 | 250 | 0.2 | 277 | 133 | 355 | Inventive |
| Sample 18 | 200 | 1.00 | 40 | 250 | 0.2 | 390 | 131 | 452 | Inventive |
| Sample 19 | 10 | 1.00 | 600 | 250 | 0.4 | 11 | 132 | 159 | Inventive |
| Sample 20 | 30 | 1.00 | 600 | 250 | 0.4 | 32 | 132 | 159 | Inventive |
| Sample 21 | 50 | 1.00 | 600 | 250 | 0.4 | 41 | 130 | 157 | Inventive |
| Sample 22 | 380 | 1.00 | 600 | 250 | 0.4 | 371 | 131 | 152 | Inventive |
| Sample 23 | 450 | 1.00 | 600 | 250 | 0.4 | 433 | 133 | 157 | Inventive |
| Sample 24 | 550 | 1.00 | 600 | 250 | 0.5 | 529 | 134 | 157 | Inventive |
| Sample 25 | 620 | 1.00 | 600 | 250 | 0.5 | 604 | 131 | 156 | Inventive |
| Sample 26 | 200 | 3.00 | 600 | 250 | 0.0 | 0 | 132 | 0 | Comparative |
| Sample 27 | 200 | — | — | — | — | 650 | 141 | 602 | Comparative |

TABLE 2

| | Reciprocating Opening and Closing Test | | | | | |
|---|---|---|---|---|---|---|
| | Adhesion Lifting-up Portion (Number/100 cm²) | Appearance (Surface) | Appearance (Gap) | Waterproof (Permeation Amount (g)) | Flexibility N | Sliding resistance N |
| Sample 1 | 0.04 | ◎ | ◎ | 0.02 | 48.5 | 4.1 |
| Sample 2 | 0.00 | ◎ | ◎ | 0.02 | 48.4 | 4.1 |
| Sample 3 | 0.00 | ◎ | ◎ | 0.02 | 48.0 | 4.0 |
| Sample 4 | 0.00 | ◎ | ◎ | 0.01 | 48.8 | 4.0 |
| Sample 5 | 0.00 | ◎ | ◎ | 0.12 | 49.4 | 4.2 |
| Sample 6 | 0.00 | ◎ | ◎ | 0.31 | 49.6 | 4.5 |
| Sample 7 | 0.00 | ◎ | ◎ | 0.45 | 49.5 | 4.6 |
| Sample 8 | 0.00 | Δ | ◎ | 0.03 | 49.4 | 4.2 |
| Sample 9 | 0.00 | ○ | ◎ | 0.02 | 56.3 | 4.5 |
| Sample 10 | 0.00 | ◎ | ◎ | 0.02 | 58.8 | 4.7 |
| Sample 11 | 0.00 | ◎ | ◎ | 0.03 | 63.9 | 5.8 |
| Sample 12 | 0.00 | ◎ | ◎ | 0.02 | 74.2 | 7.2 |
| Sample 13 | 1.08 | ◎ | ◎ | 0.02 | 49.3 | 4.3 |
| Sample 14 | 0.50 | ◎ | ◎ | 0.02 | 50.9 | 4.2 |
| Sample 15 | 0.06 | ◎ | ◎ | 0.02 | 50.8 | 4.4 |
| Sample 16 | 0.00 | ◎ | ◎ | 0.03 | 50.9 | 4.5 |
| Sample 17 | 0.00 | ◎ | ◎ | 0.14 | 51.6 | 5.0 |
| Sample 18 | 0.00 | ◎ | ◎ | 0.29 | 51.3 | 5.2 |
| Sample 19 | 0.00 | ◎ | ◎ | 0.02 | 48.7 | 7.4 |
| Sample 20 | 0.00 | ◎ | ◎ | 0.02 | 48.6 | 5.2 |
| Sample 21 | 0.00 | ◎ | ◎ | 0.02 | 48.4 | 4.8 |
| Sample 22 | 0.00 | ◎ | ◎ | 0.34 | 48.3 | 4.3 |
| Sample 23 | 0.00 | ◎ | ○ | 0.41 | 49.1 | 4.7 |
| Sample 24 | 0.00 | ◎ | ○ | 0.42 | 49.3 | 4.6 |
| Sample 25 | 0.00 | ◎ | Δ | 0.44 | 50.4 | 4.8 |
| Sample 26 | 9.14 | X | X | 1.98 | 58.9 | 5.1 |
| Sample 27 | 1.10 | ○ | X | 2.34 | 147.2 | 8.2 |

DESCRIPTION OF REFERENCE NUMERALS 10 waterproof slide fastener
11 element
12 slider
13 core thread
14 sewing thread
15 pull tab
16 upper stopper
18 fastener tape
19 waterproof coated film
20 gap
21 fastener chain
22 polyester resin
23 die
24 extruder
25 roll on resin applied surface side
26 roll on resin non-applied surface side
30 fixing jig
32 water storage member
34 opening member
36 test sample
38 angle fixture
40 spray nozzle
42 pipe
44 water quantity adjusting valve
46 water pool
48 overflow
50 flexibility test apparatus
51 moving member
52 load cell
53 pressurizer
54 clamp
60 test sample
60a loop portion
60b overlapped portion

What is claimed is:

1. A method for manufacturing a waterproof fastener chain, comprising:

preparing a fastener chain comprising a pair of fastener tapes made of polyester resin adjacent to each other at a given space (s) between each side edge thereof, and rows of elements respectively attached onto a main surface of the side edge of each of the fastener tapes;

extruding a polyester resin having a melt viscosity at 200° C. of 50 to 3000 dPa·s from an outlet of a die at 150 to 250° C. to apply the polyester resin onto a main surface of each of the fastener tapes that is opposite to the main surface having each of the attached rows of the elements, and onto the space (s), by curtain coating; and then passing the fastener chain with the applied polyester resin, between a metal roll heated at 100° C. to 250° C., which is arranged on a side of the polyester resin applied surface, and a roll having a hardness of 5 to 50° (JIS K 6253: 2006), which is arranged on a side of the polyester resin non-applied surface, while applying a pressure of 0.1 to 10.0 MPa; and then cooling and curing the polyester resin on the fastener chain.

2. The method for manufacturing the waterproof fastener chain according to claim 1, wherein a pressure applied onto the main surface of each of the fastener tapes by the polyester resin when the polyester resin is applied by the curtain coating is 1 MPa or less.

3. The method for manufacturing the waterproof fastener chain according to claim 1, wherein a distance (g) from the outlet of the die to the main surface of each of the fastener tapes onto which the polyester resin is applied by the curtain coating is from 0.1 to 2.0 mm.

4. The method for manufacturing the waterproof fastener chain according to claim 1, wherein the roll arranged on the side of the resin non-applied surface is made of a silicone resin.

5. The method for manufacturing the waterproof fastener chain according to claim 1, wherein the method is continuously carried out while conveying the fastener chain in the longitudinal direction.

* * * * *

UNITED STATES PATENT AND TRADEMARK OFFICE
CERTIFICATE OF CORRECTION

PATENT NO. : 10,433,620 B2
APPLICATION NO. : 15/535934
DATED : October 8, 2019
INVENTOR(S) : Hirokazu Kameyama et al.

It is certified that error appears in the above-identified patent and that said Letters Patent is hereby corrected as shown below:

In the Specification

In Column 6, Line 58, delete "dodecadioic" and insert -- dodecanedioic --, therefor.

Signed and Sealed this
Tenth Day of December, 2019

Andrei Iancu
*Director of the United States Patent and Trademark Office*